April 8, 1952    R. V. ALLEN    2,591,764
LIVE BAIT HOOK DEVICE
Filed Feb. 3, 1950
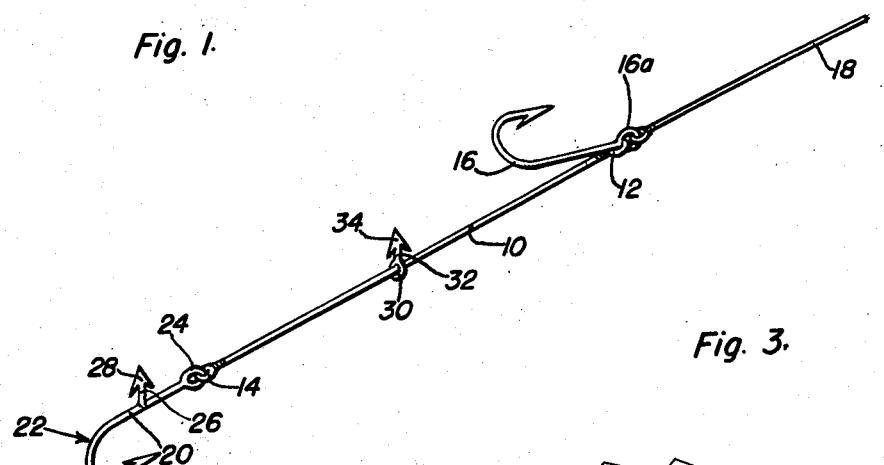
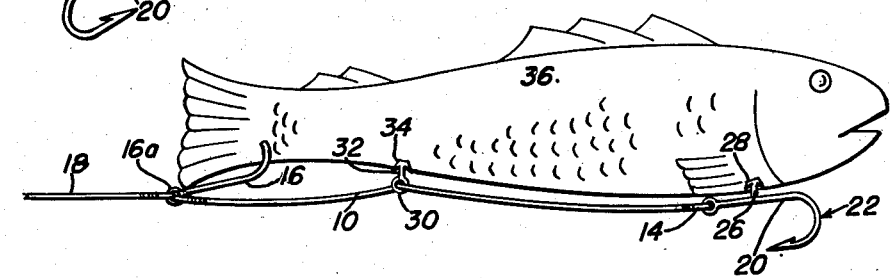
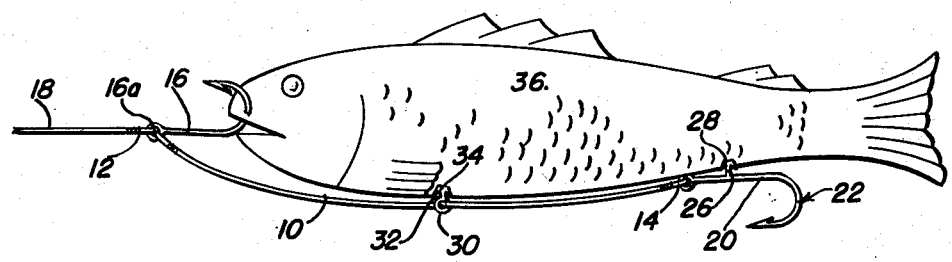
Fig. 2.
Rufus V. Allen
INVENTOR.

Patented Apr. 8, 1952

2,591,764

UNITED STATES PATENT OFFICE 2,591,764

LIVE BAIT HOOK DEVICE

Rufus V. Allen, Chino, Calif.

Application February 3, 1950, Serial No. 142,305

2 Claims. (Cl. 43—44.2)

This invention relates to new and useful improvements in fishing devices, and the primary object of the present invention is to provide a device for attaching a live bait to a fishing line and composed of a hook member for effectively catching fish.

Another very important object of the present invention is to provide a live bait hook device including a slidable anchoring means for use of the device on live bait of various lengths.

A further object of the present invention is to provide a live bait holder for fishing lines including anchoring means so constructed as to permit the holder to be quickly and readily applied to or removed from a live bait in a convenient manner.

A still further aim of the present invention is to provide a live bait hook device that is extremely small and compact in structure, reliable and efficient in use, strong and durable in use, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention attached to the hook of a fishing line;

Figure 2 is a side elevational view of the present invention in use; and

Figure 3 is a side elevational view showing another method for applying the hook device to a fish.

Referring now to the drawings in detail, wherein, for the purpose of illustration, there is disclosed a preferred embodiment of the present invention, the numeral 10 represents a flexible element, such as a leader, having terminal rings 12 and 14 suitably attached thereto.

The ring 12 engages the eye portion 16a of a fishing hook shank 16, the latter being attached to a suitable fishing line 18.

The shank portion 20 of a hook member 22 is provided with an eye portion 24 that receives the ring 14. The shank portion 20 is also provided with a laterally projecting anchoring lug 26 having a barb or pointed tip 28.

An eyelet 30, slidably received on the element 10, is provided with a radially projecting anchoring lug 32 having a barb or pointed tip 34.

In practical use of the present invention, the barb 28 is inserted into the tail portion of a live bait 36 and the eyelet 30 is moved upon the element 10 to a selected position and then the barb 34 is inserted into the fish or bait 36. The hook 16 is engaged in the mouth of the bait and the device is ready for use with the barb portion of the hook member 22 depending from the bait.

Obviously, the element 10 can be applied to overlie the bait whereby the barb portion of the hook member 22 will rise from the tail portion of the bait.

The flexibility of the element 10 will permit the bait to wiggle and assume its natural position and the barbs 28 and 34 will securely hold the element 10 to the bait.

As shown in Figure 3, the hook device may be applied to a live bait with the lug 28 penetrating the lower forward end of the bait and with the barb 34 entering the lower body portion of the bait to leave the bait's head free to maneuver.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A live bait hook device comprising an elongated flexible element having a means at one end for attachment to a hook, a hook member at the other end of said element having a shank portion, an anchoring lug projecting laterally from the shank portion of said hook member for insertion in a live bait, an eyelet freely slidable on the element, and a barbed lug projecting radially from the eyelet for penetrating the same bait receiving the anchoring lug, said anchoring lug including a barb for penetrating and anchoring the hook member to a bait.

2. A live bait hook device comprising an elongated flexible element, forward and rear hooks attached to the ends of said element, an anchoring lug projecting laterally from one of the hooks, an eyelet, freely slidable on the element between the hooks, and a barbed lug projecting radially from the eyelet.

RUFUS V. ALLEN.

REFERENCES CITED

The following references are of record in the file of this patent:

UNITED STATES PATENTS

| Number | Name | Date |
|---|---|---|
| 171,769 | Buel | Jan. 4, 1876 |
| 787,679 | Koch | Apr. 18, 1905 |
| 940,465 | Koch | Nov. 16, 1909 |
| 2,047,676 | Edmondson | July 14, 1936 |
| 2,553,895 | Carter | May 22, 1951 |

FOREIGN PATENTS

| Number | Country | Date |
|---|---|---|
| 23,457 | Great Britain | A. D. 1894 |
| 221,545 | Great Britain | Sept. 4, 1924 |